United States Patent
Scott et al.

(10) Patent No.: US 9,537,772 B2
(45) Date of Patent: *Jan. 3, 2017

(54) FLEXIBLE ROUTING TABLES FOR A HIGH-RADIX ROUTER

(71) Applicant: Intel Corporation, Santa Clara, CA (US)

(72) Inventors: Steven L. Scott, Chippewa Falls, WI (US); Gregory Hubbard, Chippewa Falls, WI (US); Dennis C. Abts, Eleva, WI (US)

(73) Assignee: Intel Corporation, Santa Clara, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/310,832

(22) Filed: Jun. 20, 2014

(65) Prior Publication Data

US 2014/0301390 A1    Oct. 9, 2014

Related U.S. Application Data

(63) Continuation of application No. 12/942,483, filed on Nov. 9, 2010, now Pat. No. 8,761,166, which is a (Continued)

(51) Int. Cl.
| | |
|---|---|
| *H04L 12/28* | (2006.01) |
| *H04L 12/743* | (2013.01) |
| *G06F 15/173* | (2006.01) |
| *H04L 12/701* | (2013.01) |
| *H04L 12/703* | (2013.01) |
| *H04L 12/721* | (2013.01) |

(Continued)

(52) U.S. Cl.
CPC ..... *H04L 45/7453* (2013.01); *G06F 15/17362* (2013.01); *H04L 45/00* (2013.01); *H04L 45/28* (2013.01); *H04L 45/566* (2013.01); *H04L 45/745* (2013.01); *H04L 49/15* (2013.01)

(58) Field of Classification Search
CPC combination set(s) only.
See application file for complete search history.

(56) References Cited

U.S. PATENT DOCUMENTS

| | | | |
|---|---|---|---|
| 5,179,558 A | 1/1993 | Thacker et al. | |
| 5,701,416 A * | 12/1997 | Thorson | G06F 15/17381 340/2.1 |

(Continued)

OTHER PUBLICATIONS

Kim et al, The BlackWidow High-Radix Clos Network, IEEE, 12 pages, 2006.*

*Primary Examiner* — Frank Duong
(74) *Attorney, Agent, or Firm* — Schwegman Lundberg & Woessner, P.A.

(57) ABSTRACT

A system and method for routing in a high-radix network. A packet is received and examined to determine if the packet can be routed adaptively. If the packet can be routed adaptively, the packet is routed adaptively, wherein routing adaptively includes selecting a column, computing a column mask, routing the packet to the column; and selecting an output port as a function of the column mask. If the packet can be routed deterministically, routing deterministically, wherein routing deterministically includes accessing a routing table to obtain an output port and routing the packet to the output port from the routing table.

25 Claims, 10 Drawing Sheets

Related U.S. Application Data continuation of application No. 12/107,016, filed on Apr. 21, 2008, now Pat. No. 7,843,929.

(60) Provisional application No. 60/925,470, filed on Apr. 20, 2007.

(51) Int. Cl.
*H04L 12/741* (2013.01)
*H04L 12/933* (2013.01)

(56) References Cited

U.S. PATENT DOCUMENTS

| | | |
|---|---|---|
| 5,841,775 A | 11/1998 | Huang |
| 6,081,507 A | 6/2000 | Chao et al. |
| 6,212,184 B1 | 4/2001 | Venkatachary et al. |
| 6,233,248 B1 | 5/2001 | Sautter et al. |
| 6,278,714 B1 | 8/2001 | Gupta |
| 6,680,915 B1 | 1/2004 | Park et al. |
| 6,757,779 B1 | 6/2004 | Wong et al. |
| 6,771,673 B1 | 8/2004 | Baum et al. |
| 7,272,648 B2 | 9/2007 | Kawasaki et al. |
| 7,362,764 B2 | 4/2008 | Johnsen et al. |
| 7,555,493 B2 | 6/2009 | Khayter et al. |
| 7,843,929 B2 | 11/2010 | Scott et al. |
| 8,761,166 B2 | 6/2014 | Scott et al. |
| 2004/0267958 A1 | 12/2004 | Reed et al. |
| 2006/0159095 A1 | 7/2006 | Cook et al. |
| 2007/0008949 A1 | 1/2007 | Balandin |
| 2008/0285562 A1 | 11/2008 | Scott et al. |
| 2011/0051724 A1 | 3/2011 | Scott et al. |

\* cited by examiner

FLEXIBLE ROUTING TABLES FOR A HIGH-RADIX ROUTER

RELATED APPLICATIONS

This application is a continuation of U.S. application Ser. No. 12/942,483, filed Nov. 9, 2010, which is a continuation of U.S. patent application Ser. No. 12/107,016, filed on Apr. 21, 2008, now issued as U.S. Pat. No. 7,843,929, which claims the benefit of priority under 35 U.S.C. §119(e) to U.S. Provisional Application Ser. No. 60/925,470 filed Apr. 20, 2007, all of which are are incorporated by reference herein in their entirety.

FEDERALLY SPONSORED RESEARCH OR DEVELOPMENT

The U.S. Government has a paid-up license in this invention and the right in limited circumstances to require the patent owner to license others on reasonable terms as provided for by the terms of contract No. MDA904-02-3-0052, awarded by the Maryland Procurement Office.

This application is related to U.S. patent application Ser. No. 12/107,011, entitled "HIGH-RADIX INTERPROCESSOR COMMUNICATIONS SYSTEM AND METHOD", filed on Apr. 21, 2008; to U.S. patent application Ser. No. 12/107,036, entitled "SPECULATIVE FORWARDING IN A HIGH-RADIX ROUTER", filed on Apr. 21, 2008; and to U.S. patent application Ser. No. 12/107,019, entitled "LOAD BALANCING FOR COMMUNICATIONS WITHIN A MULTIPROCESSOR COMPUTER SYSTEM", filed on Apr. 21, 2008; each of which is incorporated herein by reference in its entirety.

BACKGROUND OF THE INVENTION

Field of the Invention

The present invention is related to multiprocessor computer systems, and more particularly to routing control in packet traffic within a multiprocessor computer system.

Background Information

In multiprocessor computer systems, there are often multiple paths for the transfer of data between compute nodes. Messages to be sent from one node to another node within the system must, oftentimes, be told the particular path to traverse. The primary mechanisms for providing routing information are source routing, distributed table-driven routing and algorithmic routing.

Source routing is used in the Sandia ASCI Red system. In source routing, a lookup table at the source node provides routing information for the entire path of a packet through the network to its destination. The routing information is carried along with the packet and used to select router output ports at each hop. Source routing provides flexibility in selecting the route, but is less able to handle problems that may come up as the packet traverses the network.

Distributed table-driven routing is used in the Cray T3E, the Cray X1, the Cray XT3, the Mellanox IB routers and the SGI Altix. In distributed table-driven routing, a lookup table is used at each hop along the path (generally indexed by the destination node number) to determine the output port of the current router.

Distributed table-driven routing can require large routing tables, especially as the number of nodes in the system increase.

In one variation of distributed table-driven routing, the routing table specifies the output port of the next router, in a pipelined fashion. By carrying information for the selected egress port of the next router, the packet can arbitrate for the selected egress port at the time it enters a router, rather than waiting to select the egress port and then arbitrate for it. Such an approach is described in U.S. Pat. No. 5,721,819, issued Feb. 24, 1998 to Galles et al.

Galles' approach limits the number of table entries by splitting the routing table into a local routing table and a remote routing table. The local routing table is used when the packet approaches its destination to route the packet to its destination node. The remote routing table is used to push the packet in the general direction of where it is going. This approach reduces the number of entries needed in the overall routing table, but at the cost of some flexibility.

Algorithmic routing is used in the Cray T3D. In algorithmic routing, the routing logic is designed for a specific network topology, and calculates the output port based on the current location and destination node number. This approach does not need a routing table but, again, it is limited in flexibility.

What is needed is a more flexible way of using routing tables to route packets across a network.

BRIEF DESCRIPTION OF THE DRAWINGS

FIG. 7 illustrates packet traversal through the router of FIG. 4; and

FIG. 8 illustrates adaptive routing.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilised and structural changes may be made without departing from the scope of the present invention.

Figure 1:
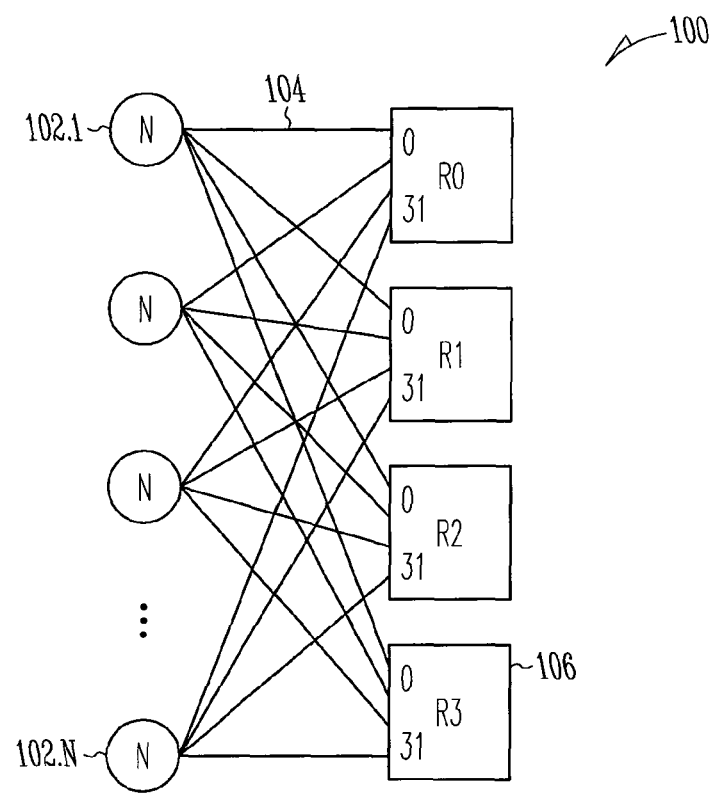
FIG. 1 illustrates a computer system with a high-radix routing system.

A computer system is shown in FIG. 1. In the computer system 100 of FIG. 1, processor nodes 102.1 through 102.N are connected by links 104 to routers 106. In the embodiment shown, each processor node 102 includes four injection ports, wherein each connection port is connected to a different router 106. In addition, each processor node 102 includes local memory and one or more processors. Each router 106 is a high-radix router as will be described below.

In one embodiment, computer system 100 is designed to run demanding applications with high communication requirements. It is a distributed shared memory multiprocessor built with high performance, high bandwidth custom processors. The processors support latency hiding, addressing and synchronization features that facilitate scaling to large system sizes.

It provides a globally shared memory with direct global load/store access. In one such embodiment, system 100 is globally cache coherent, but each processor only caches data from memory 112 within its four-processor node 102. This provides natural support for SMP applications on a single node, and hierarchical (e.g.: shmem or MPI on top of OpenMP) applications across the entire machine. Pure distributed memory applications (MPI, shmem, CAF, UPC) are supported as well.

In one such embodiment, each processor is implemented on a single chip and includes a 4-way-dispatch scalar core, 8 vector pipes, two levels of cache and a set of ports to the local memory system. Each processor in system 100 can support thousands of outstanding global memory references.

For such embodiments, the network should be designed to provide very high global bandwidth, while also providing low latency for efficient synchronization and scalability. To accomplish this, in one embodiment, routers 106 are interconnected in a high-radix folded Clos or fat-tree topology with sidelinks. By providing sidelinks, one can statically partition the global network bandwidth among the peer subtrees, reducing the cost and the latency of the network.

Figure 2:
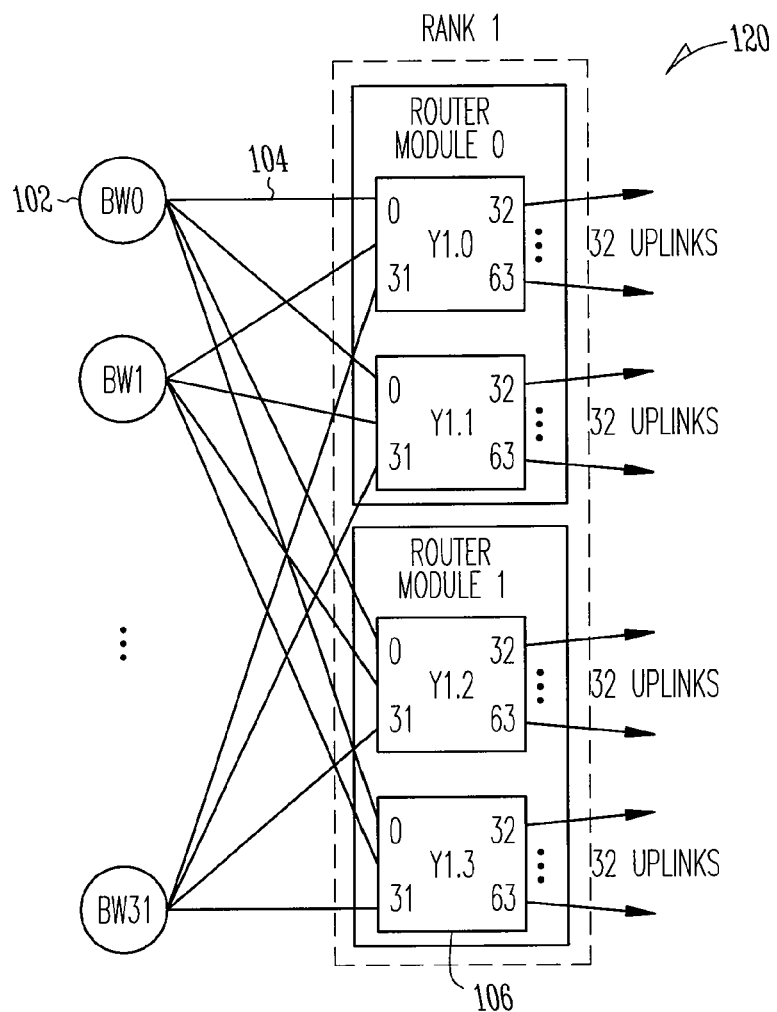
FIG. 2 illustrates the computer system of FIG. 1 with uplinks to higher rank routers.

In the embodiment shown in FIG. 2, computer system 120 uses high-radix routers 106, each of which has 64 ports that are three bits wide in each direction. In the embodiment shown, each processor node 102 has four injection ports into the network, with each port connecting to a different network slice. Each slice is a completely separate network with its own set of routers 106. The following discussion will focus on a single slice of the network.

By using a high-radix router with many narrow channels we are able to take advantage of the higher pin density and faster signaling rates available in modern ASIC technology. In one embodiment, router 106 is an 800 MHz ASIC with 64 18.75 Gb/s bidirectional ports for an aggregate offchip bandwidth of 2.4 Tb/s. Each port consists of three 6.25 Gb/s differential signals in each direction. The router supports deterministic and adaptive packet routing with separate buffering for request and reply virtual channels. The router is organized hierarchically as an 8×8 array of tiles which simplifies arbitration by avoiding long wires in the arbiters. Each tile of the array contains a router port, its associated buffering, and an 8×8 router subswitch.

In one embodiment, computer system 120 scales up to 32K processors using a variation on a folded-Clos or fat-tree network topology that can be incrementally scaled. In one such embodiment, computer system 120 is packaged in modules, chassis, and cabinets. Each compute module contains eight processors with four network ports each.

In one embodiment, a chassis holds eight compute modules organized as two 32-processor rank 1 (R1) subtrees, and up to four R1 router modules (each of which provides two network slices for one of the subtrees). Each R1 router module contains two 64-port YARC router chips (see FIG. 2) providing 64 downlinks that are routed to the processor ports via a mid-plane, and 64 uplinks (or sidelinks) that are routed to eight 96-pin cable connectors that carry eight links each. ("YARC" stands for "Yet Another Routing Chip.")

Figure 3A:
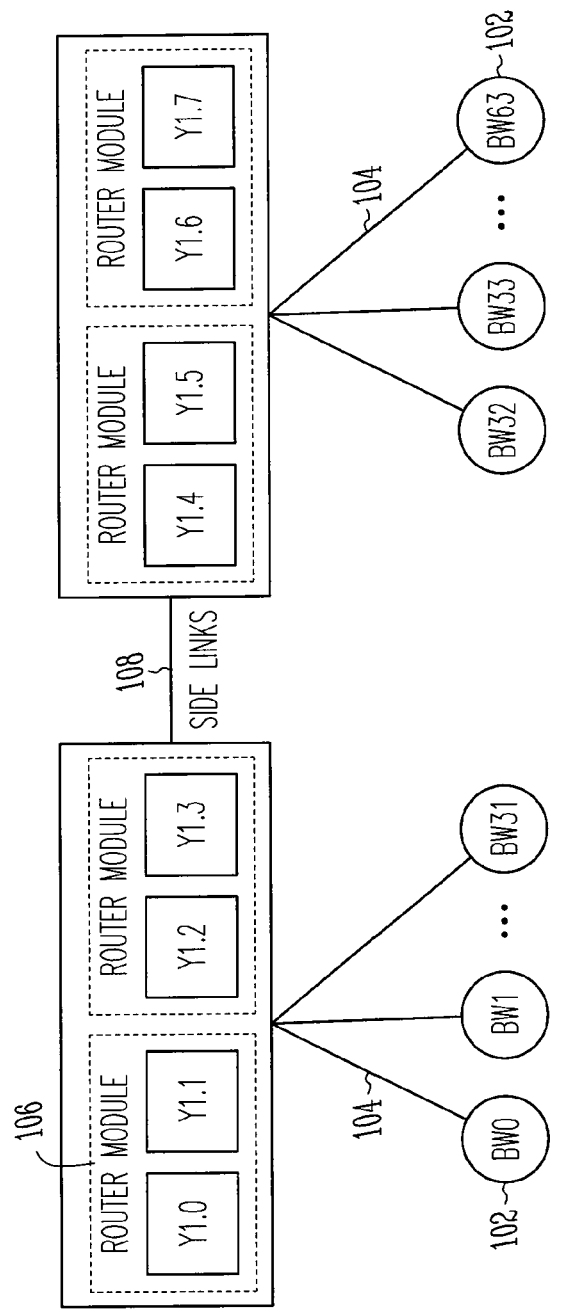
FIG. 3 (a)-(c) illustrate network topologies for computer systems.
Figure 3B:
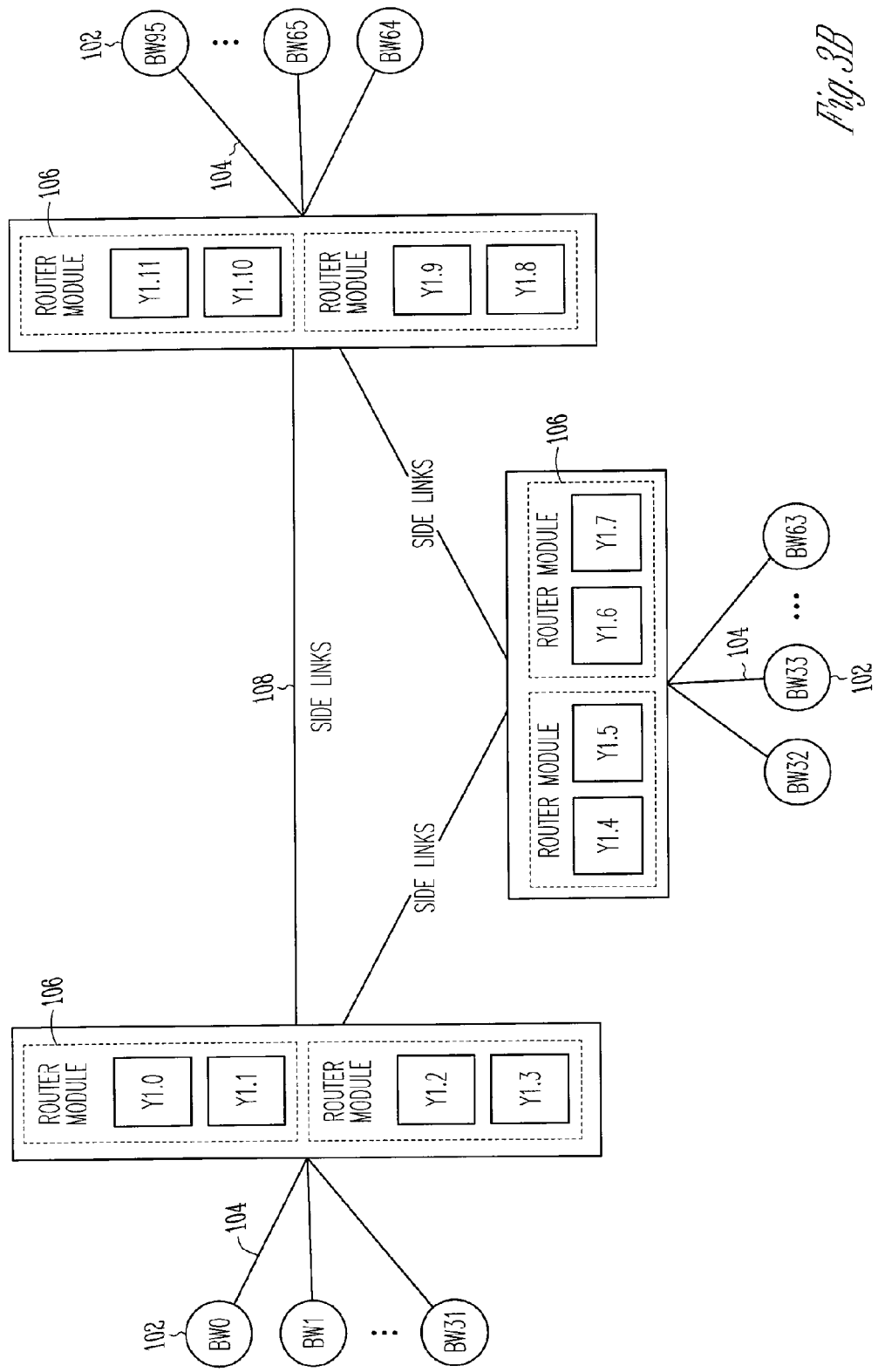

In one such embodiment, each cabinet holds two chassis (128 processors) organized as four 32-processors R1 subtrees. Machines with up to 288 processors, nine R1 subtrees, can be connected by directly cabling the R1 subtrees to one another using sidelinks 108 as shown in FIGS. 3(a) and (b) to create a rank 1.5 (R1.5) network.

To scale beyond 288 processors, uplink cables 110 from each R1 subtree are connected to rank 2 (R2) routers 112. A rank 2/3 router module (FIG. 3(c)) packages four routers 106 on an R2/R3 module.

In one embodiment, the four radix-64 routers 106 on the R2/R3 module are each split into two radix-32 virtual routers. Logically, each R2/R3 module has eight radix-32 routers providing 256 network links on 32 cable connectors. Up to 16 R2/R3 router modules are packaged into a stand-alone router cabinet.

Machines of up to 1024 processors can be constructed by connecting up to thirty-two 32-processor R1 subtrees to R2 routers. Machines of up to 4.5K processors can be constructed by connecting up to nine 512-processor R2 subtrees via side links 108. Up to 16K processors may be connected by a rank 3 (R3) network where up to thirty-two 512-processor R2 subtrees are connected by R3 routers. Networks having up to 72K processors could be constructed by connecting nine R3 subtrees via side links 108.

The above topology and packaging scheme enables very flexible provisioning of network bandwidth. For instance, by only using a single rank 1 router module (instead of two as shown in FIG. 2), the port bandwidth of each processor is reduced in half—halving both the cost of the network and its global bandwidth. An additional bandwidth taper can be achieved by connecting only a subset of the rank 1 to rank 2 network cables, reducing cabling cost and R2 router cost at the expense of the bandwidth taper.

The Router

The input-queued crossbar organization often used in low-radix routers does not scale efficiently to high radices because the arbitration logic and wiring complexity both grow quadratically with the number of inputs. To overcome this complexity, in one embodiment, router 106 is organized using a hierarchical organization in a manner similar to that proposed by Kim et al. above.

Figure 4:
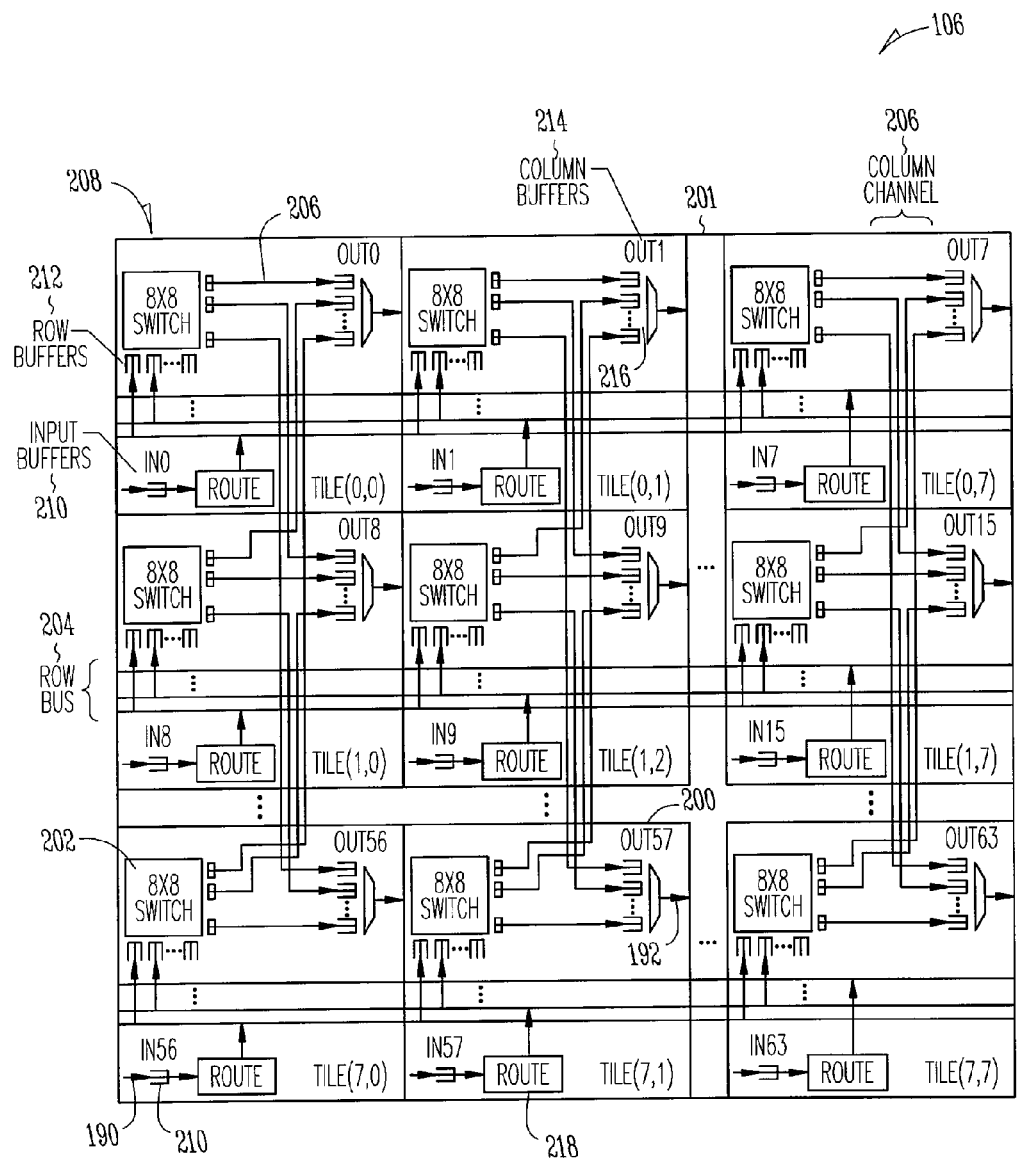
FIG. 4 illustrates one embodiment of a router for systems of FIGS. 1-3.

As shown in FIG. 4, in one embodiment router 106 is organized as an 8×8 array of tiles 200 within a single YARC chip 201. Each tile 200 contains all of the logic and buffering associated with one input port 190 and one output port 192. Each tile 200 also contains an 8×8 switch 202 and associated buffers (212, 214). Each tile's switch 202 accepts inputs from eight row buses 204 that are driven by the input ports 190 in its row, and drives separate output channels 206 to the eight output ports 192 in its column. Using a tile-based microarchitecture facilitates implementation, since each tile is identical and produces a very regular structure for replication and physical implementation in silicon.

In one embodiment, computer systems 100 and 120 use two virtual channels (VCs), designated request (v=0) and response (v=1) to avoid request-response deadlocks in the network. Therefore, all buffer resources are allocated according to the virtual channel bit in the head phit. Each input buffer is 256 phits and is sized to cover the round-trip latency across the network channel. Virtual cut-through flow control is used across the network links. In one such embodiment, each VC drives its own row bus 204. This provides some row bus speedup since you can flow request and response flits onto row busses simultaneously. It also eliminates the need for arbitration for the row busses 204.

The router 106 microarchitecture is best understood by following a packet through the router. A packet (such as packet 300 shown in FIG. 6) arrives in the input buffer 210 of a tile 200 (fed from the incoming link control block (LCB).)

When the packet reaches the head of the buffer a routing decision is made at route selector 218 to select the output column 208 for the packet. The packet is then driven onto the row bus 204 associated with the input port 190 and buffered in a row buffer 212 at the input of the 8×8 switch 202 at the junction of the packet's input row and output column. At this point the routing decision must be refined to select a particular output port 192 within the output column 208. The switch 202 then routes the packet to the column channel 206 associated with the selected output port 192. The column channel delivers the packet to an output buffer 214 (associated with the input row) at the output port multiplexer 216. Packets in the per-input-row output buffers 214 arbitrate for access to the output port 192 and, when granted access, are switched onto output port 192 via the multiplexer 216.

In the embodiment shown in FIG. 4, router 106 includes three types of buffers: input buffers 210, row buffers 212, and column buffers 214. Each buffer is partitioned into two virtual channels. One input buffer 210 and 8 row buffers 212 are associated with each input port 190. Thus, no arbitration is needed to allocate these buffers—only flow control. Eight column buffers 214 are associated with each subswitch 202. Allocation of the column buffers 214 takes place at the same time the packet is switched.

Output arbitration is performed in two stages. The first stage of arbitration is done to gain access to the output of the subswitch 202. A packet then competes with packets from other tiles 200 in the same column 208 in the second stage of arbitration for access to the output port 192. Unlike the hierarchical crossbar in Kim, however, router 106 takes advantage of the abundant on-chip wiring resources to run separate channels 206 from each output of each subswitch 202 to the corresponding output port 192. This organization places the column buffers 214 in the output tiles 200 rather than at the output of the subswitches 202. Co-locating the eight column buffers 214 associated with a given output in a single tile 200 simplifies global output arbitration. With column buffers 214 at the outputs of the subswitch 202, the requests/grants to/from the global arbiters would need to be pipelined to account for wire delay, which would complicate the arbitration logic.

Figure 5:
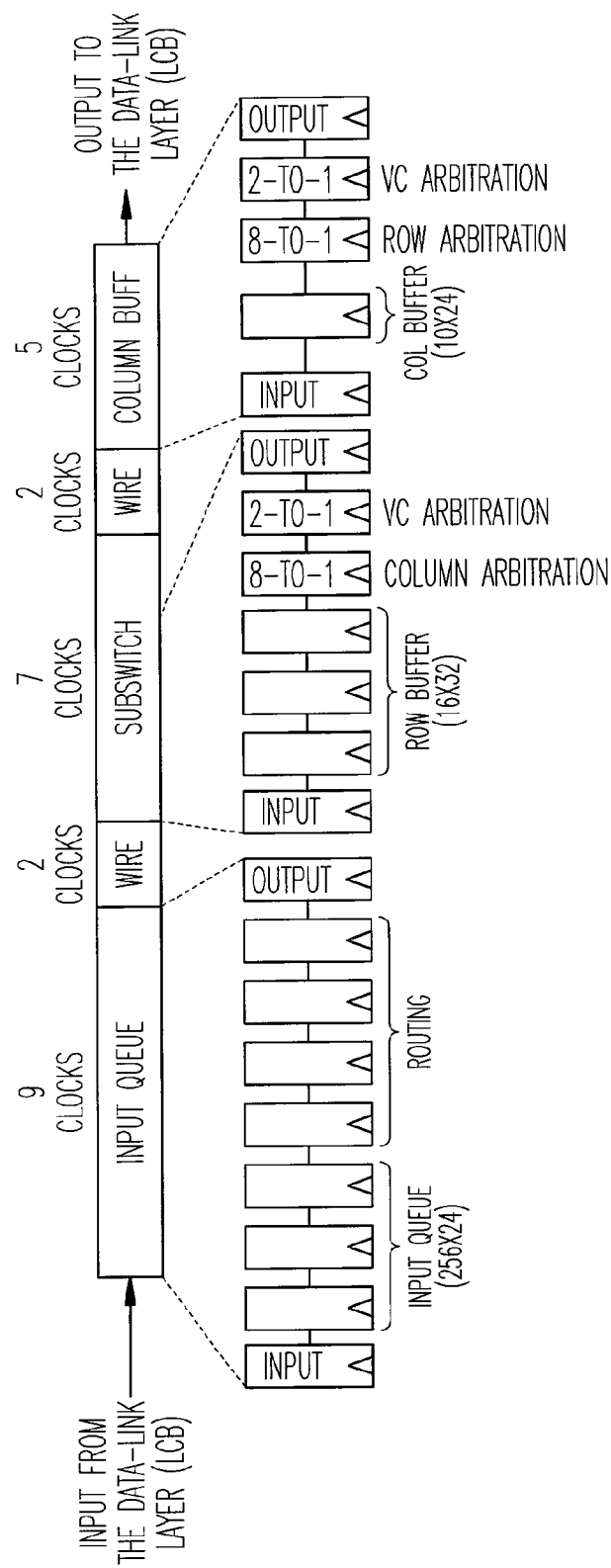
FIG. 5 illustrates latency in transfer of a packet through the router of FIG. 4.

In one embodiment of the router 106 of FIG. 4, a packet traversing router 106 passes through 25 pipeline stages, resulting in a zero-load latency of 31.25 ns. A pipeline diagram illustrating passage through such a router 106 is shown in FIG. 5. In one embodiment, each major block: input queue (210, 212), subswitch 202, and column buffers 214 is designed with both input and output registers. This approach simplified system timing and design at the expense of latency. During the design, additional pipeline stages were inserted to pipeline the wire delay associated with the row busses and the column channels.

The Communication Stack

The communication stack in computer systems 100 and 120 can be considered as three layers: network layer, data-link layer, and physical layer. We discuss the packet format, flow control across the network links, the link control block (LCB) which implements the data-link layer, and the serializer/deserializer (SerDes) at the physical layer.

Figure 6:
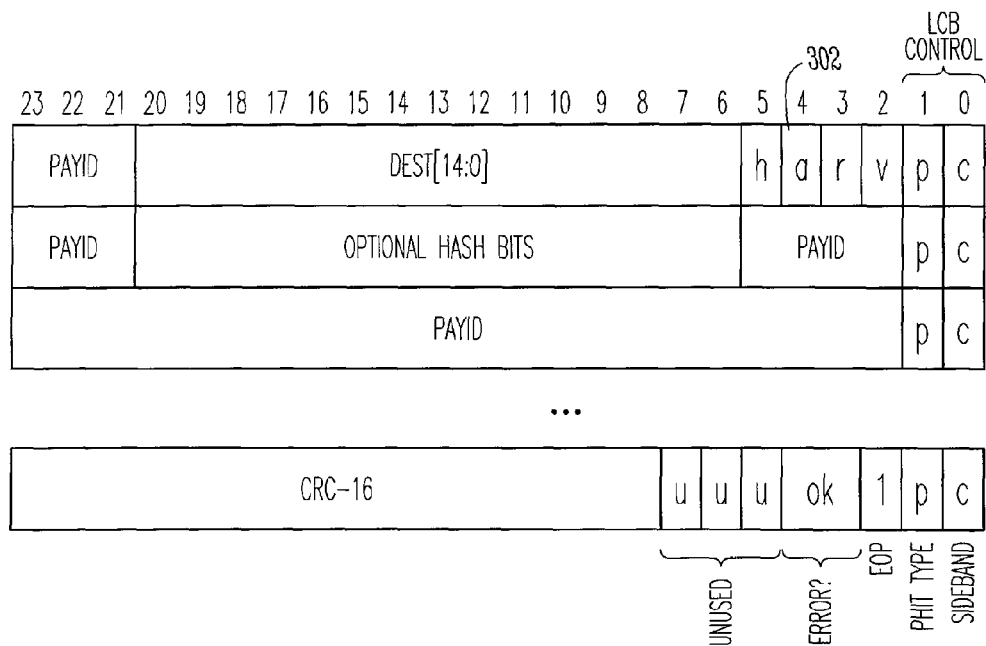
FIG. 6 illustrates one example embodiment of a packet format that can be used in the router of FIG. 4.

One embodiment of a packet that can be used in computer systems 100 and 120 is shown in FIG. 6. In one embodiment, packets are divided into 24-bit phits for transmission over internal datapaths. These phits are further serialized for transmission over 3-bit wide network channels. A minimum packet contains 4 phits carrying 32 payload bits.

Longer packets are constructed by inserting additional payload phits (like the third phit in the figure) before the tail phit. Two-bits of each phit, as well as all of the tail phit are used by the data-link layer.

The head phit of the packet controls routing. In addition to specifying the destination, this phit contains a v bit that specifies which virtual channel to use, and three bits, h, a, and r, that control routing.

If the r bit is set, the packet will employ source routing. That is, the packet header will be accompanied by a routing vector that indicates the path through the network as a list of ports used to select the output port 192 at each hop. Source routed packets are normally used only for maintenance operations such as reading and writing configuration registers on router 106.

If the a bit is set, the packet will route adaptively, otherwise it will route deterministically.

If the h bit is set, the deterministic routing algorithm employs the hash bits in the second phit to select the output port 192.

Network flow control will be discussed next. The allocation unit for flow control is a 24-bit phit—thus, the phit is really the flit (flow control unit). In one embodiment, as noted above, computer systems 100 and 120 use two virtual channels (VCs), designated request (v=0) and response (v=1) to avoid request-response deadlocks in the network. Therefore, all buffer resources are allocated according to the virtual channel bit in the head phit. Each input buffer is 256 phits and is sized to cover the round-trip latency across the network channel. Virtual cut-through flow control is used across the network links. In one embodiment, each VC drives its own row bus 204.

The data-link layer will be discussed next. In one embodiment, the data-link layer protocol is implemented by the link control block. The LCB receives phits from router 106 and injects them into the serializer logic where they are transmitted over the physical medium. The incoming LCB feeds directly to the input buffers 210.

The primary function of the LCB is to reliably transmit packets over the network links using a sliding window go-back-N protocol. The send buffer storage and retry is on a packet granularity. The link control block is described in greater detail in "Inter-ASIC Data Transport Using Link Control Block Manager," U.S. patent application Ser. No. 11/780,258, filed Jul. 19, 2007, the description of which is incorporated by reference.

In the embodiment shown in FIG. 6, the 24-bit phit uses 2-bits of sideband dedicated as a control channel for the LCB to carry sequence numbers and status information. The virtual channel acknowledgment status bits travel in the LCB sideband. These VC acks are used to increment the pervc credit counters in the output port logic. The ok field in the EOP phit indicates if the packet is healthy, encountered a transmission error on the current link (transmit_error), or was corrupted prior to transmission (soft_error).

CRC is used to detect soft errors in the pipeline data paths and static memories used for storage. Before transmitting a tail phit onto the network link, the LCB will check the current CRC against the packet contents to determine if a soft error has corrupted the packet. If the packet is corrupted, it is marked as soft_error, and a good CRC is generated so that it is not detected by the receiver as a transmission error. The packet will continue to flow through the network marked as a bad packet with a soft error and eventually be discarded by the network interface at the destination processor.

The narrow links of a high-radix router cause a higher serialization latency to squeeze the packet over a link. For example, a 32B cache-line write results in a packet with 19 phits (6 header, 12 data, and 1 EOP). Consequently, the LCB passes phits up to the higher-level logic speculatively, prior to verifying the packet CRC, which avoids store-and-forward serialization latency at each hop. However, this early forwarding complicates various error conditions in order to correctly handle a packet with a transmission error and reclaim the space in the input queue at the receiver.

Because a packet with a transmission error is speculatively passed up to the router core and may have already flowed to the next router by the time the tail phit is processed, the LCB and input queue must prevent corrupting the router state. The LCB detects packet CRC errors and marks the packet as transmit_error with a corrected CRC before handing the end-of-packet (EOP) phit up to the router core. The LCB also monitors the packet length of the received data stream and clips any packets that exceed the maximum packet length, which is programmed into an LCB configuration register. When a packet is clipped, an EOP phit is appended to the truncated packet and it is marked as transmit_error. In one embodiment, the LCB will enter error recovery mode on either error and await the retransmission.

The input queue in the router must protect from overflow. If it receives more phits than can be stored, the input queue logic will adjust the tail pointer to excise the bad packet and discard further phits from the LCB until the EOP phit is received. If a packet marked transmit_error is received at the input buffer, we want to drop the packet and avoid sending any virtual channel acknowledgments. The sender will eventually timeout and retransmit the packet. If the bad packet has not yet flowed out of the input buffer, it can simply be removed by setting the tail pointer of the queue to the tail of the previous packet. Otherwise, if the packet has flowed out of the input buffer, we let the packet go and decrement the number of virtual channel acknowledgments to send by the size of the bad packet. The transmit-side router core does not need to know anything about recovering from bad packets. All effects of the error are contained within the LCB and router input queueing logic.

The physical layer will be discussed next. The serializer/deserializer (SerDes) implements the physical layer of the communication stack. In one embodiment, router 106 instantiates a high-speed SerDes in which each lane consists of two complimentary signals making a balanced differential pair.

In one embodiment, the SerDes is organized as a macro which replicates multiple lanes. For full duplex operation, an 8-lane receiver and an 8-lane transmitter macro are instantiated. In one such embodiment, router 106 instantiates forty-eight (48) 8-lane SerDes macros, twenty-four (24) 8-lane transmit and twenty-four (24) 8-lane receive macros, consuming approximately of the available silicon in a full ASIC implementation of router 106.

In one embodiment, the SerDes supports two full-speed data rates: 5 Gbps or 6.25 Gbps. Each SerDes macro is capable of supporting full, half, and quarter data rates using clock dividers in the PLL module. This allows the following supported data rates: 6.25, 5.0, 3.125, 2.5, 1.5625, and 1.25 Gbps. This should be adequate to drive a 6 meter, 26 gauge cable at the full data rate of 6.25 Gbps, allowing for adequate printed circuit board (PCB) foil at both ends.

Figure 7:
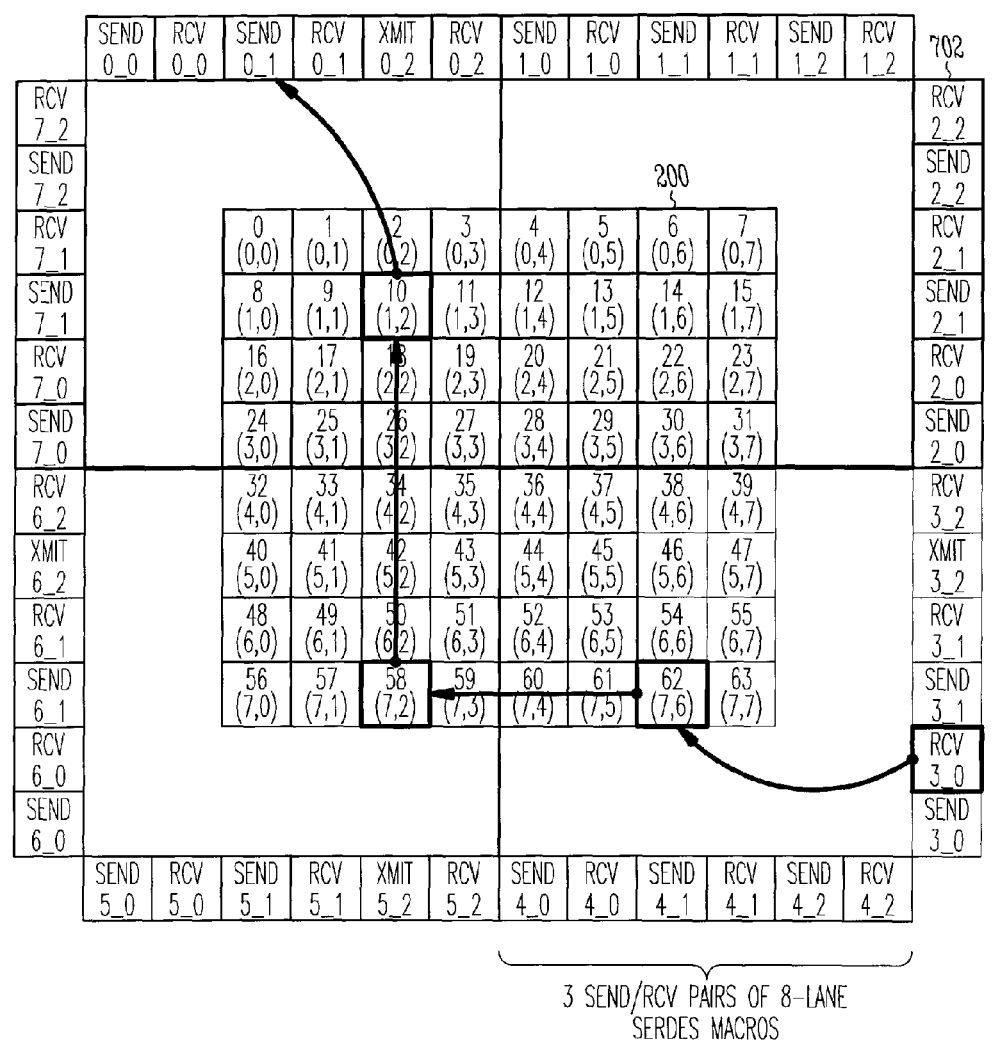

In one such embodiment, shown in FIG. 7, each port on router 106 is three bits wide, for a total of 384 low voltage differential signals coming off each router 106 (192 transmit and 192 receive). Since the SerDes macro 702 is 8 lanes wide and each router port is only 3 lanes wide, a naive assignment of tiles to SerDes would have 2 and ⅔ ports (8 lanes) for each SerDes macro. Consequently, in such an embodiment it can be useful to aggregate three SerDes macros (24 lanes) to share across eight YARC tiles (also 24 lanes). This grouping of eight tiles is called an octant (tiles belonging to the same octant are shown in FIG. 7) and, in one embodiment, imposes the constraint that each octant must operate at the same data rate.

In one embodiment, the SerDes has a 16/20 bit parallel interface which is managed by the link control block (LCB). In one embodiment, the positive and negative components of each differential signal pair can be arbitrarily swapped between the transmit/receive pair. In addition, each of the 3 lanes which comprise the LCB port can be permuted or "swizzled." The LCB determines which are the positive and negative differential pairs during channel initialization, as well as which lanes are "swizzled". This degree of freedom simplifies the board-level river routing of the channels and reduces the number of metal layers on a PCB for the router module.

Routing

Computing systems 100 and 120 implement a distributed routing algorithm, using configuration registers and small routing tables at each hop. The routing algorithm uses knowledge of fat tree topologies to avoid the need for large routing tables.

In one embodiment, routing in computing systems 100 and 120 is performed on variable length packets. The first phit of a packet is the header, which contains all the mandatory routing fields, and the last phit of a packet is an end of packet (EOP) phit which contains the packet checksum.

In a folded-Clos topology, packet routing is performed in two stages: routing up to a common ancestor of the source and destination processors, and then routing down to the destination processor. In one embodiment, up routing can use either adaptive or deterministic routing. Down routing, however, is always deterministic, as there is only a single path down the tree from any router to a destination processor.

Some systems 100 and 120 have a memory consistency model that requires that requests to the same address maintain ordering in the network. In such systems, request packets should use deterministic routing. Response packets do not require ordering, and so can be routed adaptively.

Packet routing is algorithmic and distributed. At each hop in the network, routing logic at the head of the input queue calculates the output port for the local router. This is performed using routing registers and an eight-entry routing table 220. The routing logic of route selector 218 is replicated in each tile 200, allowing multiple virtual routers per physical router and providing the needed bandwidth for parallel routing in all 64 tiles 200.

At the source, we need only select a rail (i.e.: network injection port) on which to route a given packet. In one embodiment, computer systems 100 and 120 have eight network ports, so they can support up to eight network rails. In one such embodiment, the eight rails are spread across two network interfaces (NIFs). In one embodiment, systems 100 and 120 can be configured with two, four, six or eight rails.

We would like to use all available network injection bandwidth, whether we are sending to multiple addresses at a given destination, or sending to the same address at multiple destinations. Endpoints may, however, need to preserve ordering for traffic to a given destination for a given address.

In a healthy system, all configured rails are available for all destinations. However, network faults may preclude using some rails for some destinations. For this reason, endpoints implement a lookaside buffer of some number faults, to provide a configured rails mask for a given destination.

Packets can either route adaptively or deterministically over the configured ports, depending upon the adaptive bit in the packet. For deterministic routing, endpoints are expected to choose a port based on a hash of (src, dest, address). This requires computing a hash, and then effectively performing a modulo operation over the configured ports. Note that it is important to include the source in the rail hash, so that many-to-one communication to a single synchronization variable would use all the incoming rails at the hot-spot processor.

Endpoints can either perform an actual divide using a carry-save adder tree, or do a simple combinational logic approximation that equally divides the space, but doesn't produce a strict rotation of ports for a stride-1 access stream.

In some embodiments, response packets are sent on the same rail on which the request packets were received, so that an implementation can match the response with request state saved at a particular network interface.

At each hop in the network, routing logic at the head of the input queue calculates the output port for the local router. This is performed using routing registers and tables, which are replicated at each tile, allowing multiple virtual routers per physical router, and providing the needed bandwidth for parallel routing in all 64 tiles.

In the embodiments shown in FIGS. 3(a) and (b), there are three types of links (i.e., routes): uplinks, sidelinks and downlinks. Uplinks go from the injection port to a rank 1 router or from a rank n router to a rank n+1 router. Sidelinks go from a rank n router to a peer rank n router (only for R1.5, R2.5 and R3.5 networks). Downlinks go from a rank n router to a rank n−1 router or from a rank 1 router to the destination processor.

In one embodiment, router 106 supports arbitrary mappings of logical ports to physical ports. We can route any permutation conflict-free through router 106, so there is no significant performance impact due to what physical ports are used for what logical ports or what virtual routers when a single router 106 is used as multiple virtual routers.

En route from the source to the common ancestor, the packet will take either an uplink 110 or a sidelink 108 depending on the class of the network (e.g.: rank 2 or rank 2.5, respectively). Upon arrival at the common ancestor, the router begins routing the packet down the fat tree toward its final destination using the downlinks.

In one embodiment, the down route is accomplished by extracting a logical port number directly from the destination processor number. In one such embodiment, each router 106 in computer systems 100 and 120 has 64 ports which have both a physical number, and an arbitrary logical number. System software performs network discovery when the system is initialized and assigns a logical port number to each physical port number.

Up and down routing will be discussed next. In one embodiment, each tile 200 has a root detect configuration register that identifies the subtree rooted at this router 106, using a 15-bit router location and a 15-bit mask.

The router location and mask define a subtree of the system rooted at the local router. If the unmasked bits of the packet destination and router location match, then the destination is contained within this subtree, and we can route the packet down to reach its destination, else we still need to route up (or over). As an example, the root detect register of a rank−1 router connected to destinations 96-127 would have a router location of 0x0060 (96), and a mask of 0x001F (covering 32 destinations).

If the unmasked bits of the packet destination and the router location match, then the destination processor is contained within the router's subtree, and the packet can begin traversing downward. Otherwise the packet must continue to route up (or over if sidelinks are used). In one embodiment, the router location and a 15 bit mask of lower bits are stored in a memory mapped register (MMR) in router 106.

In one embodiment, routing up or over is accomplished using an eight-entry table 220, where each entry contains a location and mask bits (like the root detect register) identifying a subtree of the network. The packet destination is associatively checked against the routing table entries. The packet matches an entry if its destination is contained within the subtree identified by that entry. The matching entry then provides one or more uplinks/sidelinks that the packet may use to reach its destination. In deterministic routing, the routing logic produces a deterministic exit port for each packet.

Packets that are marked adaptive choose one of these allowable ports dynamically, based on available space. Packets that are not marked adaptive choose one of the ports deterministically, based on a hash of input port, destination, and possibly address.

In a healthy network, only a single entry is required for up routing, matching the entire network, and identifying the full set of available uplinks. In a system with faults, additional routing table entries are used to provide alternative uplinks for affected regions of the machine. If multiple entries match, then the entry with the highest index is chosen. Thus, entry 0 could be set to match the entire network, with a full uplink mask, and entry 1 could be set to match the subtree rooted at the fault, using a constrained uplink mask that avoids sending packets to a router that would encounter the fault en route to any destination processors in that subtree.

A given network fault casts a shadow over some subtree of endpoints that can be reached going down from the fault. We only need fault entries in the routing table for faults that do not cast a shadow over the local router. A router can also ignore a fault if it cannot be reached from this router (such as faults in another network slice).

If too many faults exist in one network rail to keep track of them in the routing table, then we can unify several faults into one meta-fault at the root of a subtree that encompasses the other faults. If a network rail has too many faults to find any good routes between some pairs of endpoints, then the source routing fault table must be used to eliminate that rail for routes between those endpoints.

As an example of routing around faults, consider a fully-provisioned, 1024-endpoint, rank 2 network, consisting of 32 R1 subtrees of 32 endpoints each. Suppose that one of the R1-to-R2 links leaving a router in subtree 7 on rail 5 is broken. Since this is on rail 5, this only affects the routing tables for routers in rail 5. The uplink mask in the attached R1 router (subtree 7, rail 5) would simply exclude this bad uplink. The routing tables in the rail 5 R1 routers of other subtrees (not 7) would need to have two routing table entries. Entry 0 would be the normal entry for the whole system, and would include all 32 uplinks. Entry 1 would be set to match subtree 7 (Location=0x00e0, Mask=0x001f), and would provide a restricted uplink mask that did not include the R2 router attached to the bad link. This entry would prevent packets destined for subtree 7 from routing to the R2 router if it didn't have a good connection down to subtree 7. Note that the routing tables in R2 routers are unaffected by this fault, as R2 routers only have downlinks, and no packets are ever sent to a given R2 router if the path down to its destination from that router is not good.

In a router with configured sidelinks 108, each peer subtree is given its own routing table entry, which defines the set of sidelinks 108 usable to route to that subtree. No additional routing entries are required for faults. While the programming of the routing tables is different for siderouting, the mechanics of siderouting is identical to that of up routing, and the hardware does not know the difference.

In one embodiment, each routing table entry contains a Location field and a Mask field, for identifying the subtree to which the entry pertains. The packet destination is associatively compared against all routing table entries to determine if the packet destination lies within one of the defined subtrees.

Matching a routing table entry is just like root detection. The packet destination is compared against the Location field, with any bits corresponding to set bits in the Mask field ignored in the comparison. If the unmasked portions of the packet destination and Location field match, then the destination is within the associated subtree, and the routing table entry is used.

If two or more routing table entries match, the one with the highest index is used. This should only occur for routers which are configured with uplinks, and in the presence of network faults. If two routing table entries overlap, allowing duplicate hits, then one will correspond to a proper subtree of the other, and will be more restrictive (have fewer uplinks set in the mask) than the other. The entry corresponding to the smaller subtree should be placed in a higher routing table index, so that it will take priority if both entries are matched. Note that this implies that the default routing table entry, which corresponds to the entire network and defines the entire set of available uplinks, should be placed in entry 0 of the routing table.

Routers configured with sidelinks (i.e.: R1 routers in rank 1 networks, R2 routers in rank 2.5 networks, or R3 routers in rank 3.5 networks) should never have overlapping routing table entries (and thus should never experience multiple matches). There should be one table entry for each peer subtree in the network. Given a match, the routing table provides the set of physical ports that can be used for adaptive or physical routing.

Adaptive and Deterministic Routing

Non-uniform traffic can cause local hot spots that significantly increase contention in interconnection networks. To reduce this network load imbalance, in one embodiment router 106 performs two types of load balancing: hashing of deterministic routes to split bulk transfers up over multiple paths; and adaptive routing.

In one embodiment, packets in the network adaptively route on a per-packet basis. In one embodiment, each packet header (FIG. 6) has an adapt a bit 300 that chooses the routing policy. If a=1 then the packet will choose the output port adaptively during up or siderouting. If the adaptive bit is set in the packet, it is routed adaptively, using the 64-bit mask of physical ports from the routing table. A bit is set in the mask for each allowable physical port, with bit i of the mask corresponding to the output port in tile i of the router.

Implementing an adaptive routing scheme in a high-radix router is particularly challenging because of the large number of ports involved in the adaptive decision. Ideally, we would look at the congestion at all possible output ports (at most 32) and choose the queue with the most free space. Unfortunately, this is unrealistic in a 1.25 ns clock cycle. Instead, in keeping with the hierarchical organization of the router, we break the adaptive decision into two stages: choosing the output column, and choosing the output row within that column.

We first choose the column, c, by comparing the congestion of the row buffers in each of the c row buffers identified by bits in the column mask. A full eight-way, four-bit comparison of row buffer depths may be too expensive. Instead, in one embodiment, we look only at the most significant bit (MSB) of the row buffer depth, giving priority to buffers that are less than half full. We then select the column based on a round-robin arbitration, and route to the row buffers of the tile 201. This algorithm ignores the number of eligible output ports in each of the target columns, giving no preference to a column with more eligible outputs. However, columns with more eligible outputs will tend to drain faster, leading to more space in their subswitch row buffers.

The tiles are numbered in row-major order, Row 0 contains tiles 0 through 7, row 1 contains tiles 8 through 15, etc. Thus, a packet can route to column 0 if any of mask bits 0,8,16,24,32,40,48 or 56 is set. Similarly, a packet can route to column 1 if any of mask bits 1, 9,25,33,41,49 or 57 is set, and so on.

When routing adaptively, routing table 220 of the input port 190 produces a 64-bit mask of allowable output ports 192. In one embodiment, the column mask is formed by OR-ing together the eligible ports within each column—the resultant 8-bit mask will have bit i set if any of the eight output ports of column i are set in the output port mask produced by the routing table. After constructing the set of allowable columns, we choose the winner (the eventual output column) based on the amount of space available in the row buffer for each column. The column whose row buffer has the most available space, at some granularity, is chosen. Ties are broken using a matrix (least recently granted) arbiter.

In another embodiment, systems 100 and 120 spread adaptive traffic out to the columns in proportion to the number of set bits in that column's adaptive mask. A column with three allowable exit ports gets three times the traffic of a column with only one available exit port. (The first approach will indirectly achieve this goal anyway based on flow control from the columns. Adaptive routing will tend to route packets to exit ports that are less congested, and we would generally expect less congestion in columns that have more available exit ports.)

In the second stage of the adaptive route, we choose the output row based on the bits of the row mask which are set. The row mask identifies the set of valid output ports within the chosen column. We again must rely on imperfect information to choose the output tile based on the depth of the column buffers in the r rows, where r is the number of bits set in the row mask. We choose among the rows by comparing two bits of the 4-bit column buffer depth (which is at most 10). The most significant bit indicates if the column buffer is "almost full" (i.e. 8 or more phits in the buffer), and the upper two-bits together indicate if the column buffer has more than 4 phits but less than 8 phits—corresponding to "half full." Finally, if the upper two bits of the buffer size are zero, then the column buffer is "almost empty." The adaptive decision will choose the column buffer based on its current state, giving preference to those ports which are "almost empty" then those that are "half full" and finally those buffers that are "almost full."

In one embodiment, when the packet is sent across the row bus to the chosen column it is accompanied by an 8-bit mask corresponding to the allowable output rows within that column. This row mask is used by the 8×8 subswitch 202 to select an exit row. As noted above, the row selection at the subswitch is guided by the space available in the column buffers at the outputs, the row with the most space available in the column buffers is chosen, with ties broken by a matrix arbiter.

Figure 8:
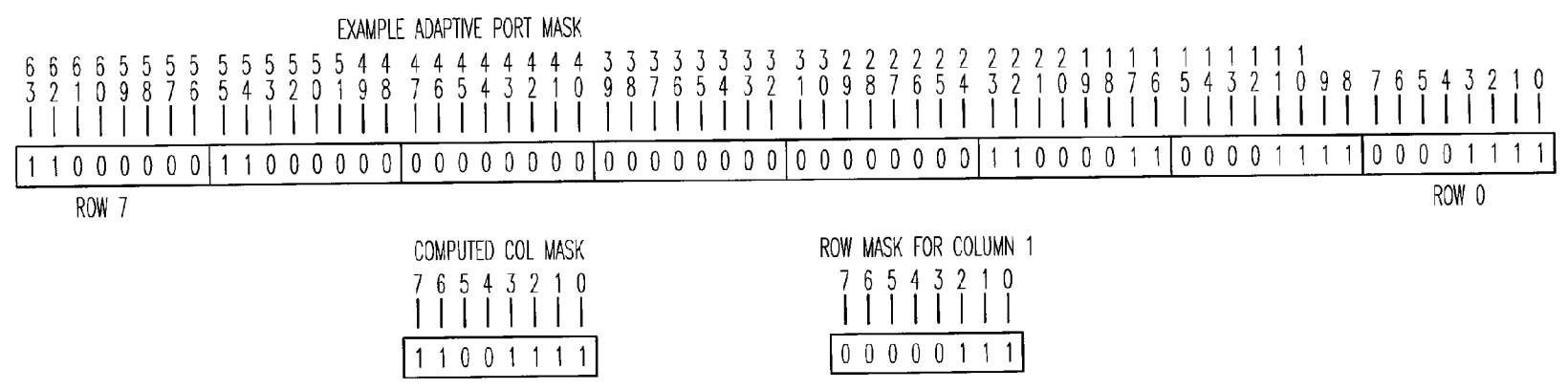

As an example of adaptive routing, consider an adaptive packet with an uplink mask of 0x0c0000000c30f0f, which has 16 set bits, as shown in FIG. 8. This results in a column mask of 0xcf, indicating that columns 0, 1,2,3,6 and 7 all have valid exit ports. Assume that the packet is routed to column 1. A row mask of 0x07 would thus be sent with the packet, indicating that it can route to rows 0, 1 and 2 within column 1.

Packets that are not marked as adaptive (a=0) are routed deterministically. In one embodiment, routers 106 perform a form of load balancing by selecting output ports based on the output of a hash function. A hash function is first computed, using the input port of the current tile, the packet destination, and optionally a part of the packet address offset. This hash function is then used to select an output port via a modulo function: the hash value is divided by the number of valid output ports, to compute a remainder, n. The packet is then routed to the nth output port.

In one embodiment the hash is an eight bit hash value formed as an XOR of the input port, destination processor, and optional hash bits. In one embodiment, it is calculated only if the hash bit (h) is set in the packet header. The hash value is then mapped onto the set of output links identified by the routing table. The input port and destination processor are hashed on to avoid non-uniformities in many-to-one traffic patterns. For request packets, the hash bit is set, and a portion of the packet's address is included in the hash function to further spread the traffic across the uplinks. In this way, we can load balance and still guarantee in-order delivery of packets from source to destination targeting a given address.

In one embodiment, if h=1, then address_bits is set to the "optional hash bits" field of the second packet phit, right shifted by the amount in the HashShift field of the routing table entry. In one such embodiment, the "optional hash bits" field of any packet marked as hashable (h=1) contain address offset bits. In some embodiments of computer systems 100 and 120, packet formats are laid out so as to have the least significant address offsets above the natural packet data size lie within the "optional hash bits" field.

Address hashing allows the packets of a block transfer between two given network endpoints to be spread out among multiple paths in the network. If address hashing is disabled, then all packets between two given endpoints and injected on the same network rail will take the same path through the network. In one embodiment, address hashing can be disabled at any given level if the network by setting the HashShift value to 15.

In one embodiment, different values of HashShift are used at different levels in the network, because using address bits to choose an uplink at a given level in the network effectively "uses up" these address bits. Incoming packets at a given router at the next level up in the network will lack diversity in these address bits, as variations in these address bits will have led packets to different uplinks. So, for example, if the least significant address bits are used in the hash to choose one of eight network ports leaving the endpoints, then the packets arriving at an R1 router will lack diversity in the bottom three bits of the address. Therefore, routing table entries in some R1 routers use a HashShift of three. If the R1 routers use the remaining address bits to choose from amongst 32 uplinks, then this will "use up" another five bits of the address, so the R2 routers could use a HashShift value of eight.

A system and method for enhancing diversity in routing is described in "LOAD BALANCING FOR COMMUNICATIONS WITHIN A MULTIPROCESSOR COMPUTER SYSTEM," U.S. patent application Ser. No. 12/107,019, filed Apr. 21, 2008 (now U.S. Pat. No. 7,864,792), the description of which is incorporated herein by reference.

Siderouting is performed using the same mechanisms as uprouting (using the routing table). Each peer subtree is given its own entry in the routing table, and there is never a need for extra routing table entries to handle faults. The reason for this is the following: All sidelinks connecting a router to a given subtree are connected to the same router within that subtree (call it router r). Therefore, all healthy links to router r are equally capable of routing to any destination within that subtree. If there were any destinations within that subtree that are not reachable from router r, then a packet to any of those destinations would not have been routed up to the current router. The packet would have been re-directed to a different router at the top level within the current subtree, from which a good path to the destination existed.

In one embodiment, computer system 100 and 120 support multiple sidelink hops (for use in degraded configurations). In a healthy system, this is never necessary, as there are direct connections to each other peer subtree. If, however, all of the links from the local router to another subtree are broken, we could still route to that subtree by routing indirectly through other subtrees. Care would need to be taken not to introduce any cyclic dependencies amongst the sidelinks, which could occur if unconstrained, multiple sidelinks routes were allowed.

Whether this multi-hop siderouting would be a good idea depends upon the configuration and expected traffic patterns. It may be better for the lower level of routers or endpoints to avoid sending any traffic destined to the affected subtree through this router.

In one embodiment, computer systems 100 and 120 support multi-hop siderouting in healthy systems. It is possible, for example, to construct a four-subtree, rank 2.5 network as a 2D hypercube of subtrees rather than a fully-connected network. In this case, each R2 router would split its sidelinks between two other routers, rather than splitting them amongst three other routers. Similarly, an eight-subtree network could be constructed as a 3D hypercube of subtrees, rather than as a directly connected network. Each router would split its sidelinks three ways rather than seven ways in this case.

Once the packet reaches a common ancestor it will begin routing down the subtree. The first step in routing down is to select a logical downlink number. The down route configuration register contains shift (s) and mask (m) values that are used by first right-shifting the destination processor number by s bits and then masking the bottom m bits to produce the logical output port number for the downlink. A rank 1 router, for example, would have s=0 and m=00011111. The logical port number is converted to a physical port number by a 64-entry port mapping table. The packet proceeds down the tree, shifting and masking the bits of destination processor to determine the downlink at each level, until it reaches the final egress port where it is sent to the processor's network interface.

Vector Routing

As noted above, if the r bit is set, the packet will employ source routing. That is, the packet header will be accompanied by a routing vector that indicates the path through the network as a list of ports used to select the output port 192 at each hop.

Source routed packets are normally used only for maintenance operations such as reading and writing configuration registers on router 106.

In one embodiment, all routing to/from a local block within router 106 uses vector routed packets. This includes both "normal", multi-hop vector routed packets used to access MMRs, and "short", single-hop vector routed packets used for barriers and global clock. In one embodiment, the op field specifies the type of vector routed packet. When a packet leaves the local block, its L bit is set to 1, and the port field is set to the physical exit port number for this router. As the packet enters a new router 106, the L bit is set to 0, and the port is set to the physical entry port number (for reasons discussed below). The L (visited LCB) bit thus tells the routing logic whether to send the vector routed packet out the specified exit port (L=1), or send it to the LCB, which is attached to tile 0, 0 (L=0).

When a vector routed packet is first formed (via special MMRs in the local block or by a router 106 or by an endpoint), the destination port of the first router (or endpoint) is placed in the port field. The H (home) bit is set if the packet is routing only one hop. For multi-hop packets, the exit port for the next router is placed into the hop0 field (lower 6 bits), the exit port for the next router is placed into the hop1 field, and so on. An exit port number of 0xff indicates that the packet is home and should not be routed further.

At each hop, the packet is routed to the local block, and consumed there if the H bit is set in the first flit. Otherwise, the lower 6 bits of the hop0 field is copied into the port field, the H bit is set if the hop0 field is 0xff, and the hop fields are shifted down one byte value (hop1 shifted into hop0, hop2 shifted into hop1, etc.). When a request packet reaches its destination (H=1), the packet is processed, and a response packet is generated. The return path for a vector routed response packet is encoded explicitly in the request packet (it is not built up along the way; thus the response does not have to follow the same path back to the source). The return hop fields from the request are copied into the hop fields for the response. Then hop0 is copied up into the port field and the other hop fields are shifted down. The return path, therefore, only supports 8 hops, whereas the request path actually supported 9 hops.

In order to support network discovery, in which we don't know through what port we are accessing the chip on the "frontier," in one embodiment the rhop0 field is treated differently than the other rhop fields. In such an embodiment, if the rhop0 field is set to all ones (0xff), then the response packet is sent out the same port through which it entered the target chip. This port number is obtained from the port field, which was stuffed by the input queue logic when the vector-routed request packet entered the chip. Discovery software can read the physical port number and use that number to build up its knowledge of the topology.

Note that vector routed packets may be longer than they need to be. Both requests and responses include one data word, even though Get requests and Put Responses do not normally include a data word.

In one embodiment, the local block does not check the CRC of Vector Routed (VR) packets it receives (it does check the good pkt bit), but it re-generates the CRC after it modifies the packet and sends it out. Thus, in such embodiment, VR packets are protected from the LB to the output port, and protected across the links, but are not protected from the input port to the LB. Given the tiny fraction of VR to regular traffic, this is not a problem.

The Tile

In one embodiment, each tile 200 is broken into four blocks: the link control block (LCB), input buffers, 8×8 subswitch, and column buffers. The input buffer block contains 122k cells (46% registers, 35% logic, and 19% SRAM) which includes the routing table and routing logic. A considerable amount of this logic is dedicated to handling speculative data forwarding—the LCB passing data up from the data-link layer prior to verifying the CRC—to handle error cases due to transmission errors and soft errors. The 8×8 subswitch accounts for 141k cells (54% registers, 25% logic, and 21% SRAM), or approximately ⅓ of the logic in the tile. The subswitch contains the row buffers and logic that performs the 8-to-1 arbitration among the row buffers, and a 2-to-1 arbitration amongst the virtual channels. The column buffer block which also performs the same two-stage arbitration as the subswitch only accounts for 62k cells (71% registers, and 29% logic). The column buffers are implemented in latches, not SRAMs, so the bulk of the area in the column buffers is dedicated to latches. The remaining 111k cells, or 25% of the tile area, is consumed by the LCB.

Selecting the Radix

The radix at which a network has minimum latency is largely determined by the aspect ratio of the network router. As noted by Kim, aspect ratio is given by:

$$A = (Bt_r \log N)/L$$

where B is the total bandwidth of a router, $t_r$ is the per router delay, N is the size of the network, and L is the length of a packet. In an embodiment where the aspect ratio is 1600, the optimal radix would be 82.

While the optimal radix is 82, this is not a practical value. To simplify implementation and routing, the radix should be a power of 2. A radix that is not a power of 2 would require an integer division and modulo operation to determine the output port from a destination address. In one design approach, we consider radices of 64, and 128. Both of these values give network latency within 2% of the optimal value. Although the higher radix of 128 theoretically leads to lower cost, this theory assumes that port widths can be varied continuously. In one embodiment, we selected a radix of 64 because it gives better performance with our pinout and integral port-width constraints.

In one radix-64 embodiment, area constraints limited us to no more than 200 SerDes on the router chip. A radix-64 router using 3-bit wide ports requires 192 SerDes, fitting nicely within this constraint. A radix-128 router, on the other hand, is limited to 1-bit wide ports requiring 128 SerDes. Such a router has only ⅔ the bandwidth of the radix 64 router, resulting in significantly lower performance.

Some computer systems have cabinet-to-cabinet spacing that requires network links longer than six meters, the maximum length that can be driven reliably at the full signaling rate (6.25 Gb/s) of one embodiment of router 106. Such long links can be realized using optical signaling or using electrical cables with in-line repeaters. However, both of these alternatives carry a significant cost premium. If router 106 supports variable signaling rates (as described for SerDes 702 above) and flexible routing enable, these long links can be realized using electrical signaling over passive cables by using a reverse taper. By reducing the signaling rate on the link, significantly longer electrical cables can be driven. The reduced signaling rate can be offset for by doubling the number of links provisioned at that level of the network (a reverse taper) to preserve network bandwidth.

We chose a high-radix folded-Clos topology for computer systems 100 and 120 because it offered both lower latency and lower cost than alternatives such as a torus network while still providing 8.33 GB/s of global memory bandwidth. We performed a zero-load latency comparison of the two different topologies. For the high-radix Clos network, radix-64 routers were used. For the 3-D torus, the configurations used were similar to those of the Cray XT3. Uniform random traffic was assumed in calculating the average hop count of the network.

For a small size network, there is a 2× reduction in latency when going from a 3-D torus to a high-radix Clos network. As the size of the network increases, however, there is over a 4× reduction in latency. With the lower hop count, the high-radix Clos not only reduces latency but also reduces cost. This is because network cost is approximately proportional to the total router bandwidth and, with the network bisection held constant; it is proportional to the hop count. Thus, high-radix Clos networks lead to a lower latency and a lower cost network.

There are also several qualitative attributes of the high-radix folded-Clos network which made it an attractive choice. Routing in torus is more complex as turn rules or virtual channels are needed to prevent deadlocks. In addition, complex routing algorithms are needed to properly load balance across adversarial traffic pattern.

In contrast, the folded-Clos has very a straightforward routing algorithm. Because of the path diversity in the topology, load balancing is achieved by selecting any one of the common ancestors. The folded Clos is also cycle-free by design so no additional virtual channels are needed to break deadlock. VC allocation is often the critical path in the router implementation and with fewer VCs, the VC allocation is also simplified.

Partitioning the Router

The radix-64 router 106 can be divided into multiple virtual routers with lower degree. For instance, a single router 106 can serve as two radix-32, four radix-16, or ten radix-6 virtual routers 106. Since each tile 200 has its own set of routing tables 220 and keeps track of the set of allowable exit ports, system software can partition the router into multiple virtual routers by programming the routing tables 220 associated with each virtual router with a set of masks that restricts output traffic to the ports 192 of that virtual router. This flexibility enables a router such as router 106 to be used in systems where packaging constraints require multiple lower radix routers.

Figure 3C:
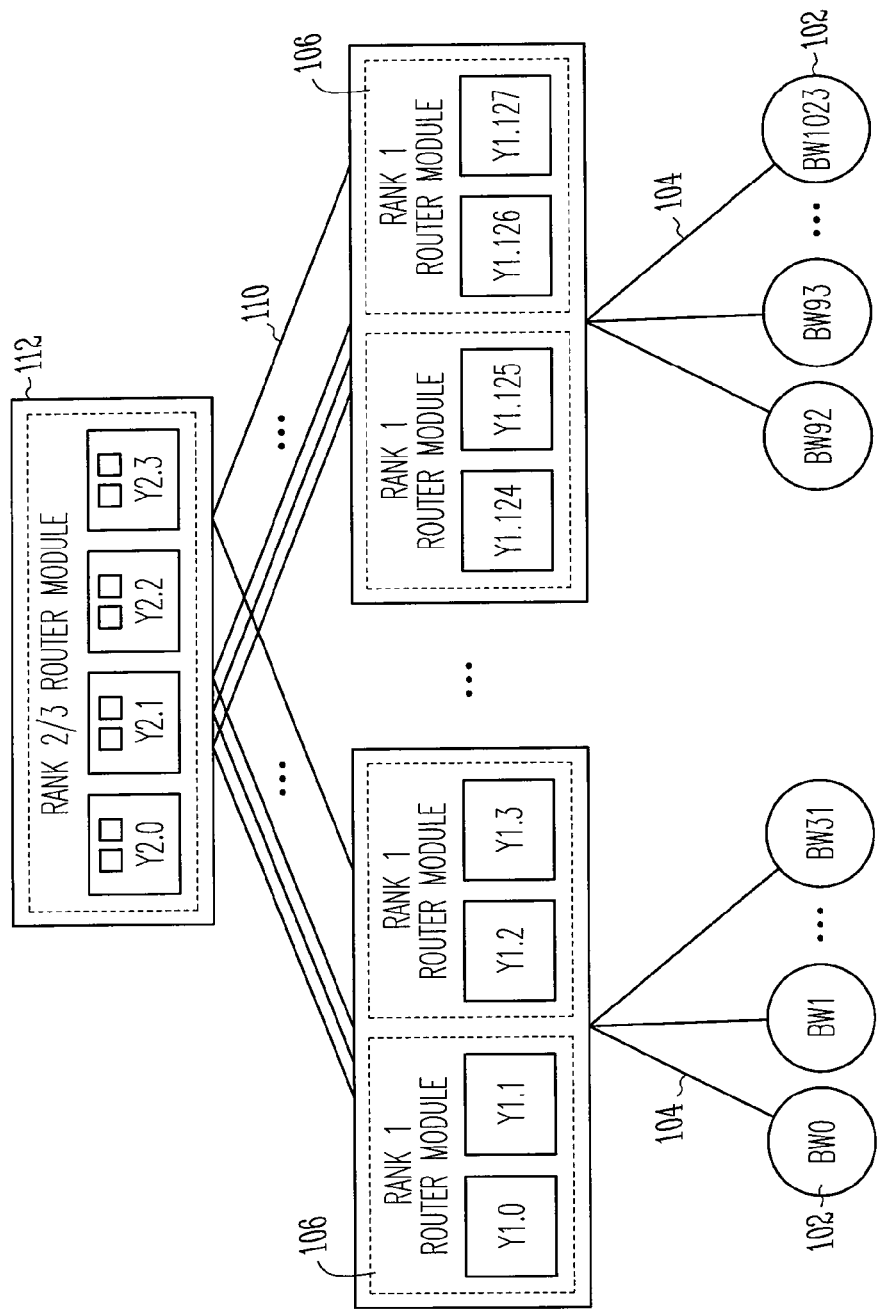

Virtual routers can also be used to support multiple network slices in a single YARC chip 201. For example, a single YARC chip 201 can be configured as two radix-32 routers to provide a radix-32 first stage switch for two of the four BW network slices as shown in FIG. 3(c).

In one embodiment, router 106 employs virtual cut-through flow control externally but uses wormhole flow-control internally due to buffer size constraints. In one such embodiment, the 64 input buffers 210 are each sized deep enough (256 phits) to account for a round-trip credit latency plus the length of a maximum-length packet (19 phits). This enables us to perform virtual cut-through flow control (with packet granularity) on external links.

It may not be feasible, however, to size the 512 row buffers or 512 column buffers large enough to account for credit latency plus maximum packet size. Thus wormhole flow control (at flit=phit granularity) is performed over both the row buses and the column channels to manage these buffers. In one embodiment, the row buffers 212 are 16 phits deep and the column buffers 214 are 10 phits deep—large enough to cover the credit latency over the global column lines. Here a maximum-length packet can block traffic from the same input row to other outputs in the same column (by leaving its tail in the row buffer).

In a hierarchical high-radix router 106, a radix-k router is composed of a number of p×p subswitches 202. The number needed is $(k/p)^2$. The cost and performance of the router depend on p. As p is reduced, the design approaches that of a fully buffered crossbar and becomes prohibitively expensive but provides higher performance. As p is increased, the design approaches an input-buffered crossbar and is inexpensive but has poor performance.

To stress the hierarchical organization, we applied worst-case traffic to router 106 in which all of the offered traffic "turns the corner" at a single subswitch 202. With this approach, with an offered load of $\lambda$, one subswitch 202 in each row sees $\lambda$p packets per cycle while the other sub-switches in the row are idle. In contrast, uniform random (UR) traffic does not stress the hierarchical organization because it evenly distributes traffic across the k p sub-switches 202 in a row with each subswitch 202 seeing only $\lambda$p/k packets per cycle.

We wrote a simulator to evaluate the performance on worst-case traffic for subswitches with degree p of 2, 4, 8, 16, and 32. Subswitches 220 where p is 8, 16, or 32 perform almost identically with a throughput of about 60%. Since a p×p subswitch 202 provides an internal speedup of k/p, (8, 4 and 2 respectively for p=8, 16 and 32), a sustained throughput of 60% provides more than sufficient performance for uniform traffic. With an 8×8 subswitch 202, we can sustain approximately five times the average traffic demand through our subswitch on uniform traffic, providing plenty of headroom for non-uniform traffic patterns.

Although 8, 16, or 32 input subswitches 202 provide nearly identical performance, higher degree subswitches give lower cost because the buffering required is $O(k^2/p)$. However, in one embodiment, we chose the more expensive p=8 configuration for two reasons. First, the higher-degree subswitches required too much time to perform the p-to-1 switch arbitration, which is a timing critical path in the implementation. Early results showed that an 8-to-1 arbitration can be done within a single 800 MHz clock cycle. A 16- or 32-to-1 arbitration would require a longer clock cycle or a pipelined arbiter. Second, a subswitch of size p=8 resulted in a modular design in which the number of ports was equal to the number of subswitches. This enabled us to build a tile that contained a single subswitch, a single input, and a single output.

A higher subswitch size would require each tile to have multiple inputs/outputs, while a smaller subswitch size would require several subswitches to share an input/output complicating the design effort of the tiles.

Fault Tolerance

The high path diversity of a high-radix folded-Clos network can be exploited to provide a degree of fault tolerance. The YARC chip 201 is designed to construct a network that provides graceful degradation in the presence of the following faults: a failed network cable or connector; a faulty router (i.e., a router 106 that stops responding); and a noisy high-speed serial lane that is causing excessive retries.

In a fault-free network, only a single entry in the routing table 220 is necessary to specify the uplinks for the entire system. However, higher-priority table entries can be used to override this master entry to restrict routing to a set of destinations. If a fault occurs at a particular node of the network, the routing tables can be set so that traffic with destinations in the subtree beneath the fault do not route to the fault or any ancestors of the fault. This is done by creating an entry that matches this set of destinations that has an uplink mask with the bits corresponding to the faulty node and/or its ancestors cleared.

In one embodiment, the sender-side of each port maintains a forward progress countdown timer for each virtual channel. If the forward progress timer expires, it indicates that a packet has not flowed in a long time and the router must prevent the error from propagating throughout the network. A forward progress timeout may happen if the attached processor stops accepting requests, causing the network to back pressure into the routers 106. Upon detection of a forward progress timeout, an interrupt is raised to the maintenance controller to inform the system software that a node has stopped responding. The router will begin discarding packets that are destined to port which incurred the timeout.

In one embodiment, a link control block (LCB) handles the data-link layer of the communication stack. It provides reliable packet delivery across each network link using a sliding window go-back-N protocol. It manages the interface between the higher-level core logic and the lower-level SerDes interface (physical layer). The LCB counts the number of retries on a per-lane basis as a figure of merit for that serial channel. System software defines a threshold for the number of tolerable retries for any of the serial lanes within the 3-lane port.

In one embodiment, if the LCB detects that the retry count exceeded the threshold, it will automatically decommission the noisy lane and operate in a degraded (2-bit wide or 1-bit wide) mode until the cable can be checked and possibly replaced. This allows the application to make forward progress in the presence of persistent retries on a given network link.

If all the lanes in the link are inoperable and must be disabled, the LCB will deassert the link active signal to the higher-level logic which will cause a system-level interrupt to the maintenance controller and cause the sending port to discard any packets destined to the dead port. This prevents the single link failure from cascading into the rest of the network.

A folded-Clos topology is cycle free and under normal operating conditions is deadlock-free. In one embodiment, router 106 is designed to ensure the following invariant: once a packet begins traversing downward, it remains going downward until it reaches the destination. That is, packets that arrived from an uplink must route to a downlink. This prevents packets from being caught in a cycle containing uplinks and downlinks. If the router is configured properly, this should never happen. However, software and the programmers who create it are fallible. This dynamic invariant should help reduce the debugging time when investigating early-production routing software.

Router 106 is a high-radix router used in the network of computer systems 100 and 120. Computer systems 100 and 120 that use routers 106 with sixty-four 3-bit wide ports, scale up to 32K processors using a folded-Clos topology with a worst-case diameter of seven hops. In one embodiment, each router 106 has an aggregate bandwidth of 2.4 Tb/s and a 32K-processor BlackWidow system has a bisection bandwidth of 2.5 Pb/s.

Router 106 uses a hierarchical organization to overcome the quadratic scaling of conventional input-buffered routers. A two level hierarchy is organized as an 8×8 array of tiles. This organization simplifies arbitration with a minimal loss in performance. The tiled organization also resulted in a modular design that could be implemented in a short period of time.

The architecture of router 106 is strongly influenced by the constraints of modern ASIC technology. For instance, router 106 takes advantage of abundant on-chip wiring to provide separate column buses from each subswitch to each output port, greatly simplifying output arbitration. To operate using limited on-chip buffering, router 106 uses wormhole flow control internally while using virtual-cut-through flow control over external channels.

To reduce the cost and the latency of the network, computer systems 100 and 120 use a folded-Clos network which, in some cases, is modified by adding sidelinks 108 to connect peer subtrees and statically partition the global network bandwidth. Such networks are superior to torus networks in terms of fault tolerance and bandwidth spreading. In some embodiments, both adaptive and deterministic routing algorithms are implemented in the network to provide load-balancing across the network and still maintain ordering on memory requests.

The flexible routing system described above keeps the routing tables small, even for very large networks. This is particularly important for high-radix routers, which require a large number of lookup tables, both for routing bandwidth and to allow unique routing functions for each input. The 64-port router 106 described above has a separate routing table and logic at each of its 64 input ports. It supports up to 32768 total network endpoints, yet uses only 8-entry lookup tables and a handful of registers for routing.

By having unique routing tables at each router input, a router can easily be partitioned into multiple virtual routers, each containing a smaller number of ports. For example, a 64-port router could function as four separate 16-port routers.

The routing mechanism is still very flexible, even though it uses only a small number of routing table entries. It can accommodate several network topologies, and can accommodate networks with several faults. This is accomplished by matching routing table entries based on a masked comparison against the destination node number rather than simply indexing into a table using the destination node number. The routing tables support at least conventional fat-trees, partial-rank fat-trees (in which multiple fat-tree networks are connected as peers using sidelinks from the root routers), hypercubes and hybrid fat-tree/hypercubes.

The attached documents describe routing in conventional and partial-rank fat-trees. A healthy fat-tree network can be routed using a single routing table entry that represents the allowable set of uplinks for the entire network. Faults can be accommodated using the fixed priority of routing table entry matches. Only faults that are reachable from the current router need to be reflected in a giving routing table. If the number of faults exceeds the ability of the routing tables to track them precisely, then faults can be aggregated at the cost of giving up some bandwidth. A partial-rank fat-tree with n+1 peer subtrees can be routed using n routing table entries, even in the presence of faults.

Hypercube routing uses a single routing table entry per dimension. A routing table entry for dimension i can be set to match all the network endpoints that differ from the current node only in dimensions i or lower. Thus, an n-entry routing table can accommodate up to $2^n$ network endpoints.

The routing table mechanism is able to detect several error conditions caused by improperly configured routing tables. For example, an input can be marked as an "uplink", in which case any arriving packets must be traveling down a fat-tree, and an error condition is flagged if the packet matches a routing table entry and attempts to route up again. Node ID checks at the egress ports of the network can also detect any mis-routed packets (packets that are delivered to a network endpoint that differs from the destination node number in the packet).

Unlike source-routing, this routing mechanism permits adaptive routing and/or bandwidth spreading by performing a table-lookup and routing step at each hop in the network. Also, network bandwidth is saved by not having to send the full routing information along with the packet.

Unlike algorithmic routing, this routing mechanism is flexible, accommodating multiple network topologies as well as networks with a large number of faults.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A multiprocessor computer system interconnect network node comprising a router, the router comprising routing logic, a plurality of input ports and a plurality of output ports, wherein the output ports are arranged in columns, the router comprising:
   a receiver to receive a packet on an input port, wherein the receiver is designed to examine a packet and to determine if the packet is to be routed down to its destination;
   a deterministic router control to route the packet deterministically, wherein the deterministic router control is designed to access a routing table to obtain a deterministic output port and to route the packet to the deterministic output port obtained from the routing table; and
   an adaptive router control to route the packet adaptively, wherein the adaptive router control is designed to access a routing table to obtain an indication of allowable output ports, select a selected output port from the allowable output ports, and route the packet to the selected output port; wherein the packet is routed by the adaptive router control if the packet indicates that it can be routed adaptively and the route is not down to its destination, and the packet is routed by the deterministic router control otherwise.

2. The router of claim 1, wherein the deterministic router control is designed to compute a hash function and select output ports based on an output of the hash function.

3. The router of claim 2, wherein the hash function is a function of input port and destination processor.

4. The router of claim 1, wherein the adaptive router control is designed to associatively check packet destination against routing table entries.

5. The router of claim 1, wherein the adaptive router control is designed to route the packet to a column selected from the columns that include an allowable output port.

6. The router of claim 1, wherein the adaptive router control is designed to route the packet to a column selected from the columns that include an allowable output port and to send a row mask of allowable output ports with the packet.

7. The router of claim 1, wherein the packets are variable length packets with a plurality of fields.

8. The router of claim 1, wherein the router is configured as an array of router tiles, wherein each router tile in the array of router tiles includes one input and one output port and wherein each router tile is coupled to other output tiles that are in the same row and column.

9. The router of claim 1, wherein each routing table is adapted to avoid faults.

10. In a multiprocessor computer system having microprocessors connected by a router, wherein the router comprises routing logic, a plurality of input ports and a plurality of output ports, wherein the output ports are arranged in columns, a method of routing a packet through the router, the method comprising:
    receiving a packet on an input port, wherein the packet includes a plurality of fields;
    examining the packet to determine if the packet is routing down to its destination;
    if the packet is routing down to its destination, routing deterministically, wherein routing deterministically includes:
      accessing a routing table to obtain an output port; and
    routing the packet to the output port obtained from the routing table; if the packet is not routing down, examining the packet to determine if the packet can be routed adaptively; if the packet is not routing down and can be routed adaptively, routing the packet adaptively, wherein routing adaptively includes:
      accessing a routing table to obtain an indication of allowable output ports;
    forming a column mask, wherein the column mask indicates each column that includes an allowable output port;
    selecting, from the column mask, one of the columns that includes an allowable output port;
    routing the packet to the selected column; and
    selecting an output port from the allowable output ports within the column; if the packet is not routing down and cannot be routed adaptively, routing the packet deterministically.

11. The method of claim 10, wherein accessing a routing table while deterministically routing includes computing a hash function and selecting output ports based on an output of the hash function.

12. The method of claim 11, wherein the hash function is a function of input port and destination processor.

13. The method of claim 10, wherein accessing a routing table to obtain an indication of allowable output ports includes associatively checking packet destination against routing table entries.

14. The method of claim 10, wherein routing the packet to the selected column includes sending a row mask with the packet, wherein the row mask indicates the allowable output ports within the column.

15. The method of claim 10, wherein the method further comprises adding entries to the routing table to avoid faults.

16. A non-transitory machine readable storage medium including program code which, when executed, causes a machine to perform operations for routing a packet through a router that connects microprocessors of a multiprocessor computer system, the router comprising routing logic, a plurality of input ports and a plurality of output ports arranged in columns, the operations comprising:
- receiving a packet on an input port, wherein the packet includes a plurality of fields;
- examining the packet to determine if the packet is routing down to its destination;
- if the packet is routing down to its destination, routing deterministically, wherein routing deterministically includes:
  - accessing a routing table to obtain an output port; and
  - routing the packet to the output port obtained from the routing table; if the packet is not routing down, examining the packet to determine if the packet can be routed adaptively; if the packet is not routing down and can be routed adaptively, routing the packet adaptively, wherein routing adaptively includes:
    - accessing a routing table to obtain an indication of allowable output ports;
    - forming a column mask, wherein the column mask indicates each column that includes an allowable output port;
    - selecting, from the column mask, one of the columns that includes an allowable output port;
    - routing the packet to the selected column; and
    - selecting an output port from the allowable output ports within the column; if the packet is not routing down and cannot be routed adaptively, routing the packet deterministically.

17. A multiprocessor computer system comprising a plurality of nodes, each of the plurality of nodes comprising a router, each router comprising routing logic, a plurality of input ports and a plurality of output ports, wherein the output ports are arranged in columns, each router comprising:
- a receiver to receive a packet on an input port, wherein the receiver is designed to examine a packet and to determine if the packet is to be routed down to its destination;
- a deterministic router control to route the packet deterministically, wherein the deterministic router control is designed to access a routing table to obtain a deterministic output port and to route the packet to the deterministic output port obtained from the routing table; and
- an adaptive router control to route the packet adaptively, wherein the adaptive router control is designed to access a routing table to obtain an indication of allowable output ports, select a selected output port from the allowable output ports, and route the packet to the selected output port; wherein the packet is routed by the adaptive router control if the packet indicates that it can be routed adaptively and the route is not down to its destination, and the packet is routed by the deterministic router control otherwise.

18. The multiprocessor computer system of claim 17, wherein the deterministic router control is designed to compute a hash function and select output ports based on an output of the hash function.

19. The multiprocessor computer system of claim 18, wherein the hash function is a function of input port and destination processor.

20. The multiprocessor computer system of claim 17, wherein the adaptive router control is designed to associatively check packet destination against routing table entries.

21. The multiprocessor computer system of claim 17, wherein the adaptive router control is designed to route the packet to a column selected from the columns that include an allowable output port.

22. The multiprocessor computer system of claim 17, wherein the adaptive router control is designed to route the packet to a column selected from the columns that include an allowable output port and to send a row mask of allowable output ports with the packet.

23. The multiprocessor computer system of claim 17, wherein the packets are variable length packets with a plurality of fields.

24. The multiprocessor computer system of claim 17, wherein the router is configured as an array of router tiles, wherein each router tile in the array of router tiles includes one input and one output port and wherein each router tile is coupled to other output tiles that are in the same row and column.

25. The multiprocessor computer system of claim 17, wherein each routing table is adapted to avoid faults.

* * * * *